United States Patent
Santin

(10) Patent No.: US 10,423,131 B2
(45) Date of Patent: Sep. 24, 2019

(54) QUADRATIC PROGRAM SOLVER FOR MPC USING VARIABLE ORDERING

(71) Applicant: GARRETT TRANSPORTATION I INC., Torrance, CA (US)

(72) Inventor: Ondrej Santin, Svijany (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 442 days.

(21) Appl. No.: 15/215,253

(22) Filed: Jul. 20, 2016

(65) Prior Publication Data

US 2017/0031332 A1    Feb. 2, 2017

(30) Foreign Application Priority Data

Jul. 31, 2015 (EP) .................................. 15179435.1

(51) Int. Cl.
*G06F 15/18* (2006.01)
*G06F 17/00* (2019.01)
(Continued)

(52) U.S. Cl.
CPC .......... *G05B 13/048* (2013.01); *G06F 7/483* (2013.01); *G06F 17/16* (2013.01); *G06F 2207/483* (2013.01)

(58) Field of Classification Search
CPC . G05B 13/00; G06N 20/00; G06N 5/00; F25J 2290/10

(Continued)

(56) References Cited

U.S. PATENT DOCUMENTS 3,744,461 A   7/1973 Davis
4,005,578 A   2/1977 McInerney
(Continued)

FOREIGN PATENT DOCUMENTS

CN   102063561 A   5/2011
CN   102331350 A   1/2012
(Continued)

OTHER PUBLICATIONS

Van Den Boom et al., "MPC for Max-Plus-Linear Systems: Closed-Loop Behavior and Tuning," Proceedings of the 2001 American Control Conference, Arlington, Va, pp. 325-330, Jun. 2001.
(Continued)

*Primary Examiner* — Hsien Ming Lee
(74) *Attorney, Agent, or Firm* — Seager, Tufte & Wickhem, LLP

(57) ABSTRACT

A system and approach for storing factors in a quadratic programming solver of an embedded model predictive control platform. The solver may be connected to an optimization model which may be connected to a factorization module. The factorization module may incorporate a memory containing saved factors that may be connected to a factor search mechanism to find a nearest stored factor in the memory. A factor update unit may be connected to the factor search mechanism to obtain the nearest stored factor to perform a factor update. The factorization module may provide variable ordering to reduce a number of factors that need to be stored to permit the factors to be updated at zero floating point operations per unit of time.

4 Claims, 11 Drawing Sheets

(51) Int. Cl.
*G05B 13/04* (2006.01)
*G06F 7/483* (2006.01)
*G06F 17/16* (2006.01)

(58) Field of Classification Search
USPC .............................. 706/12, 14, 46, 50; 703/2
See application file for complete search history.

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamel et al. |
| 4,671,235 A | 6/1987 | Hosaka |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa et al. |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A | 4/1998 | Wassick et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,917,405 A | 6/1999 | Joao |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong et al. |
| 6,048,628 A | 4/2000 | Hilman et al. |
| 6,055,810 A | 5/2000 | Borland et al. |
| 6,056,781 A | 5/2000 | Wassick et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,351 B1 | 11/2001 | Chutorash |
| 6,314,662 B1 | 11/2001 | Ellis, III |
| 6,314,724 B1 | 11/2001 | Kakuyama et al. |
| 6,321,538 B2 | 11/2001 | Hasler et al. |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,203 B1 | 5/2002 | Jordan et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 9/2002 | Zhao et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,481,139 B2 | 11/2002 | Weldle |
| 6,494,038 B2 | 12/2002 | Kobayashi et al. |
| 6,502,391 B1 | 1/2003 | Hirota et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,542,076 B1 | 4/2003 | Joao |
| 6,546,329 B2 | 4/2003 | Bellinger |
| 6,549,130 B1 | 4/2003 | Joao |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |

(56) References Cited

U.S. PATENT DOCUMENTS

| | | |
|---|---|---|
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,596 B2 | 12/2003 | Kawashima et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Sumilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,837,042 B2 | 1/2005 | Colignon et al. |
| 6,839,637 B2 | 1/2005 | Moteki et al. |
| 6,849,030 B2 | 2/2005 | Yamamoto et al. |
| 6,857,264 B2 | 2/2005 | Ament |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,990,401 B2 | 1/2006 | Neiss et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,050,863 B2 | 5/2006 | Mehta et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,067,319 B2 | 6/2006 | Wills et al. |
| 7,069,903 B2 | 7/2006 | Sumilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Sumilla |
| 7,111,455 B2 | 9/2006 | Okugawa et al. |
| 7,113,835 B2 | 9/2006 | Boyen et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,164,800 B2 | 1/2007 | Sun |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,277,010 B2 | 10/2007 | Joao |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,383,118 B2 | 3/2008 | Imai et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |
| 7,389,773 B2 | 6/2008 | Stewart et al. |
| 7,392,129 B2 | 6/2008 | Hill et al. |
| 7,397,363 B2 | 7/2008 | Joao |
| 7,398,082 B2 | 7/2008 | Schwinke et al. |
| 7,398,149 B2 | 7/2008 | Ueno et al. |
| 7,400,933 B2 | 7/2008 | Rawlings et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |

(56) References Cited

U.S. PATENT DOCUMENTS

| | | |
|---|---|---|
| 7,474,953 B2 | 1/2009 | Hulser et al. |
| 7,493,236 B1 | 2/2009 | Mock et al. |
| 7,505,879 B2 | 3/2009 | Tomoyasu et al. |
| 7,505,882 B2 | 3/2009 | Jenny et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,603,185 B2 | 10/2009 | Stewart et al. |
| 7,603,226 B2 | 10/2009 | Henein |
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,676,318 B2 | 3/2010 | Allain |
| 7,698,004 B2 | 4/2010 | Boyden et al. |
| 7,702,519 B2 | 4/2010 | Boyden et al. |
| 7,712,139 B2 | 5/2010 | Westendorf et al. |
| 7,721,030 B2 | 5/2010 | Fuehrer et al. |
| 7,725,199 B2 | 5/2010 | Brackney et al. |
| 7,734,291 B2 | 6/2010 | Mazzara, Jr. |
| 7,738,975 B2 | 6/2010 | Denison et al. |
| 7,743,606 B2 | 6/2010 | Havelena et al. |
| 7,748,217 B2 | 7/2010 | Muller |
| 7,752,840 B2 | 7/2010 | Stewart |
| 7,765,792 B2 | 8/2010 | Rhodes et al. |
| 7,779,680 B2 | 8/2010 | Sasaki et al. |
| 7,793,489 B2 | 9/2010 | Wang et al. |
| 7,798,938 B2 | 9/2010 | Matsubara et al. |
| 7,808,371 B2 | 10/2010 | Blanchet et al. |
| 7,813,884 B2 | 10/2010 | Chu et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Vouzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,861,518 B2 | 1/2011 | Federle |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,891,669 B2 | 2/2011 | Araujo et al. |
| 7,904,280 B2 | 3/2011 | Wood |
| 7,905,103 B2 | 3/2011 | Larsen et al. |
| 7,907,769 B2 | 3/2011 | Sammak et al. |
| 7,925,399 B2 | 4/2011 | Comeau |
| 7,930,044 B2 | 4/2011 | Attarwala |
| 7,933,849 B2 | 4/2011 | Bartee et al. |
| 7,958,730 B2 | 6/2011 | Stewart et al. |
| 7,970,482 B2 | 6/2011 | Srinivasan et al. |
| 7,987,145 B2 | 7/2011 | Baramov |
| 7,996,140 B2 | 8/2011 | Stewart et al. |
| 8,001,767 B2 | 8/2011 | Kakuya et al. |
| 8,019,911 B2 | 9/2011 | Dressler et al. |
| 8,025,167 B2 | 9/2011 | Schneider et al. |
| 8,032,235 B2 | 10/2011 | Sayyar-Rodsari |
| 8,046,089 B2 | 10/2011 | Renfro et al. |
| 8,046,090 B2 | 10/2011 | MacArthur et al. |
| 8,060,290 B2 | 11/2011 | Stewart et al. |
| 8,078,291 B2 | 12/2011 | Pekar et al. |
| 8,108,790 B2 | 1/2012 | Morrison, Jr. et al. |
| 8,109,255 B2 | 2/2012 | Stewart et al. |
| 8,121,818 B2 | 2/2012 | Gorinevsky |
| 8,145,329 B2 | 3/2012 | Pekar et al. |
| 8,146,850 B2 | 4/2012 | Havlena et al. |
| 8,157,035 B2 | 4/2012 | Whitney et al. |
| 8,185,217 B2 | 5/2012 | Thiele |
| 8,197,753 B2 | 6/2012 | Boyden et al. |
| 8,200,346 B2 | 6/2012 | Thiele |
| 8,209,963 B2 | 7/2012 | Kesse et al. |
| 8,229,163 B2 | 7/2012 | Coleman et al. |
| 8,245,501 B2 | 8/2012 | He et al. |
| 8,246,508 B2 | 8/2012 | Matsubara et al. |
| 8,265,854 B2 | 9/2012 | Stewart et al. |
| 8,281,572 B2 | 10/2012 | Chi et al. |
| 8,295,951 B2 | 10/2012 | Crisalle et al. |
| 8,311,653 B2 | 11/2012 | Zhan et al. |
| 8,312,860 B2 | 11/2012 | Yun et al. |
| 8,316,235 B2 | 11/2012 | Boehl et al. |
| 8,360,040 B2 | 1/2013 | Stewart et al. |
| 8,370,052 B2 | 2/2013 | Lin et al. |
| 8,379,267 B2 | 2/2013 | Mestha et al. |
| 8,396,644 B2 | 3/2013 | Kabashima et al. |
| 8,402,268 B2 | 3/2013 | Dierickx |
| 8,418,441 B2 | 4/2013 | He et al. |
| 8,453,431 B2 | 6/2013 | Wang et al. |
| 8,473,079 B2 | 6/2013 | Havlena |
| 8,478,506 B2 | 7/2013 | Grichnik et al. |
| RE44,452 E | 8/2013 | Stewart et al. |
| 8,504,175 B2 | 8/2013 | Pekar et al. |
| 8,505,278 B2 | 8/2013 | Farrell et al. |
| 8,543,170 B2 | 9/2013 | Mazzara, Jr. et al. |
| 8,555,613 B2 | 10/2013 | Wang et al. |
| 8,571,689 B2 | 10/2013 | Macharia et al. |
| 8,596,045 B2 | 12/2013 | Tuomivaara et al. |
| 8,620,461 B2 | 12/2013 | Kihas |
| 8,634,940 B2 | 1/2014 | Macharia et al. |
| 8,639,925 B2 | 1/2014 | Schuetze |
| 8,649,884 B2 | 2/2014 | MacArthur et al. |
| 8,649,961 B2 | 2/2014 | Hawkins et al. |
| 8,667,288 B2 | 3/2014 | Yavuz |
| 8,694,197 B2 | 4/2014 | Rajagopalan et al. |
| 8,700,291 B2 | 4/2014 | Herrmann |
| 8,751,241 B2 | 6/2014 | Oesterling et al. |
| 8,762,026 B2 | 6/2014 | Wolfe et al. |
| 8,763,377 B2 | 7/2014 | Yacoub |
| 8,768,996 B2 | 7/2014 | Shokrollahi et al. |
| 8,813,690 B2 | 8/2014 | Kumar et al. |
| 8,825,243 B2 | 9/2014 | Yang et al. |
| 8,839,967 B2 | 9/2014 | Schneider et al. |
| 8,867,746 B2 | 10/2014 | Ceskutti et al. |
| 8,892,221 B2 | 11/2014 | Kram et al. |
| 8,899,018 B2 | 12/2014 | Frazier et al. |
| 8,904,760 B2 | 12/2014 | Mital |
| 8,924,331 B2 | 12/2014 | Pekar et al. |
| 8,983,069 B2 | 3/2015 | Merchan et al. |
| 9,100,193 B2 | 8/2015 | Newsome et al. |
| 9,141,996 B2 | 9/2015 | Christensen et al. |
| 9,170,573 B2 | 10/2015 | Kihas |
| 9,175,595 B2 | 11/2015 | Ceynow et al. |
| 9,223,301 B2 | 12/2015 | Stewart et al. |
| 9,243,576 B2 | 1/2016 | Yu et al. |
| 9,253,200 B2 | 2/2016 | Schwarz et al. |
| 9,325,494 B2 | 4/2016 | Boehl |
| 9,367,701 B2 | 6/2016 | Merchan et al. |
| 9,367,968 B2 | 6/2016 | Giraud et al. |
| 9,483,881 B2 | 11/2016 | Comeau et al. |
| 9,560,071 B2 | 1/2017 | Ruvio et al. |
| 9,779,742 B2 | 10/2017 | Newsome, Jr. |
| 2002/0112469 A1 | 8/2002 | Kanazawa et al. |
| 2004/0006973 A1 | 1/2004 | Makki et al. |
| 2004/0086185 A1 | 5/2004 | Sun |
| 2004/0144082 A1 | 7/2004 | Mianzo et al. |
| 2004/0199481 A1 | 10/2004 | Hartman et al. |
| 2004/0226287 A1 | 11/2004 | Edgar et al. |
| 2005/0171667 A1 | 8/2005 | Morita |
| 2005/0187643 A1 | 8/2005 | Sayyar-Rodsari et al. |
| 2005/0193739 A1 | 9/2005 | Brunnell et al. |
| 2005/0210868 A1 | 9/2005 | Funabashi |
| 2006/0047607 A1 | 3/2006 | Boyden et al. |
| 2006/0111881 A1 | 5/2006 | Jackson |
| 2006/0137347 A1 | 6/2006 | Stewart et al. |
| 2006/0168945 A1 | 8/2006 | Samad et al. |
| 2006/0185626 A1 | 8/2006 | Allen et al. |
| 2006/0212140 A1 | 9/2006 | Brackney |

(56) References Cited

U.S. PATENT DOCUMENTS

| | | |
|---|---|---|
| 2007/0144149 A1 | 6/2007 | Kolavennu et al. |
| 2007/0156259 A1 | 7/2007 | Baramov et al. |
| 2007/0240213 A1 | 10/2007 | Karam et al. |
| 2007/0261648 A1 | 11/2007 | Reckels et al. |
| 2007/0275471 A1 | 11/2007 | Coward |
| 2008/0010973 A1 | 1/2008 | Gimbres |
| 2008/0103747 A1 | 5/2008 | Macharia et al. |
| 2008/0132178 A1 | 6/2008 | Chatterjee et al. |
| 2008/0208778 A1 | 8/2008 | Sayyar-Rodsari et al. |
| 2008/0289605 A1 | 11/2008 | Ito |
| 2009/0172416 A1 | 7/2009 | Bosch et al. |
| 2009/0312998 A1 | 12/2009 | Berckmans et al. |
| 2010/0122523 A1 | 5/2010 | Vosz |
| 2010/0126481 A1 | 5/2010 | Willi et al. |
| 2010/0300069 A1 | 12/2010 | Herrmann et al. |
| 2011/0056265 A1 | 3/2011 | Yacoub |
| 2011/0060424 A1 | 3/2011 | Havlena |
| 2011/0125295 A1 | 5/2011 | Bednasch et al. |
| 2011/0131017 A1 | 6/2011 | Cheng et al. |
| 2011/0167025 A1 | 7/2011 | Danai et al. |
| 2011/0173315 A1 | 7/2011 | Aguren |
| 2011/0264353 A1 | 10/2011 | Atkinson et al. |
| 2011/0270505 A1 | 11/2011 | Chaturvedi et al. |
| 2012/0024089 A1 | 2/2012 | Couey et al. |
| 2012/0059782 A1* | 3/2012 | Pekar .............. G06F 17/11 706/46 |
| 2012/0109620 A1 | 5/2012 | Gaikwad et al. |
| 2012/0174187 A1 | 7/2012 | Argon et al. |
| 2013/0024069 A1 | 1/2013 | Wang et al. |
| 2013/0067894 A1 | 3/2013 | Stewart et al. |
| 2013/0111878 A1 | 5/2013 | Pachner et al. |
| 2013/0111905 A1 | 5/2013 | Pekar et al. |
| 2013/0131954 A1 | 5/2013 | Yu et al. |
| 2013/0131956 A1 | 5/2013 | Thibault et al. |
| 2013/0158834 A1 | 6/2013 | Wagner et al. |
| 2013/0204403 A1 | 8/2013 | Zheng et al. |
| 2013/0242706 A1 | 9/2013 | Newsome, Jr. |
| 2013/0326232 A1 | 12/2013 | Lewis et al. |
| 2013/0326630 A1 | 12/2013 | Argon |
| 2013/0338900 A1 | 12/2013 | Ardanese et al. |
| 2014/0032189 A1 | 1/2014 | Hehle et al. |
| 2014/0034460 A1 | 2/2014 | Chou |
| 2014/0171856 A1 | 6/2014 | McLaughlin et al. |
| 2014/0258736 A1 | 9/2014 | Merchan et al. |
| 2014/0270163 A1 | 9/2014 | Merchan |
| 2014/0316683 A1 | 10/2014 | Whitney et al. |
| 2014/0318216 A1 | 10/2014 | Singh |
| 2014/0343713 A1 | 11/2014 | Ziegler et al. |
| 2014/0358254 A1 | 12/2014 | Chu et al. |
| 2015/0121071 A1 | 4/2015 | Schwarz et al. |
| 2015/0275783 A1 | 10/2015 | Wong et al. |
| 2015/0321642 A1 | 11/2015 | Schwepp et al. |
| 2015/0324576 A1 | 11/2015 | Quirant et al. |
| 2015/0334093 A1 | 11/2015 | Mueller |
| 2015/0354877 A1 | 12/2015 | Burns et al. |
| 2016/0003180 A1 | 1/2016 | McNulty et al. |
| 2016/0043832 A1 | 2/2016 | Ahn et al. |
| 2016/0108732 A1 | 4/2016 | Huang et al. |
| 2016/0127357 A1 | 5/2016 | Zibuschka et al. |
| 2016/0216699 A1 | 7/2016 | Pekar et al. |
| 2016/0239593 A1 | 8/2016 | Pekar et al. |
| 2016/0259584 A1 | 9/2016 | Schlottmann et al. |
| 2016/0330204 A1 | 11/2016 | Baur et al. |
| 2016/0344705 A1 | 11/2016 | Stumpf et al. |
| 2016/0362838 A1 | 12/2016 | Badwe et al. |
| 2016/0365977 A1 | 12/2016 | Boutros et al. |
| 2017/0031332 A1 | 2/2017 | Santin |
| 2017/0048063 A1 | 2/2017 | Mueller |
| 2017/0126701 A1 | 5/2017 | Glas et al. |
| 2017/0218860 A1 | 8/2017 | Pachner et al. |
| 2017/0300713 A1 | 10/2017 | Fan et al. |
| 2017/0306871 A1 | 10/2017 | Fuxman et al. |

FOREIGN PATENT DOCUMENTS

| | | |
|---|---|---|
| DE | 19628796 C1 | 10/1997 |
| DE | 10219382 A1 | 11/2002 |
| DE | 102009016509 A1 | 10/2010 |
| DE | 102011103346 A1 | 8/2012 |
| EA | 0950803 B1 | 9/2003 |
| EP | 0301527 A2 | 2/1989 |
| EP | 0877309 B1 | 6/2000 |
| EP | 1134368 A2 | 9/2001 |
| EP | 1180583 A2 | 2/2002 |
| EP | 1221544 A2 | 7/2002 |
| EP | 1225490 A2 | 7/2002 |
| EP | 1245811 A2 | 10/2002 |
| EP | 1273337 A1 | 1/2003 |
| EP | 1420153 A2 | 5/2004 |
| EP | 1447727 A2 | 8/2004 |
| EP | 1498791 A1 | 1/2005 |
| EP | 1425642 B1 | 11/2005 |
| EP | 1686251 A1 | 8/2006 |
| EP | 1399784 B1 | 10/2007 |
| EP | 2107439 A1 | 10/2009 |
| EP | 2146258 A1 | 1/2010 |
| EP | 1794339 B1 | 7/2011 |
| EP | 1529941 B1 | 11/2011 |
| EP | 2543845 A1 | 1/2013 |
| EP | 2551480 A1 | 1/2013 |
| EP | 2589779 A2 | 5/2013 |
| EP | 2617975 A1 | 7/2013 |
| EP | 2267559 B1 | 1/2014 |
| EP | 2919079 A2 | 9/2015 |
| JP | 59190433 A | 10/1984 |
| JP | 2010282618 A | 12/2010 |
| WO | 0144629 A2 | 6/2001 |
| WO | 0169056 A1 | 9/2001 |
| WO | 0232552 A1 | 4/2002 |
| WO | 02097540 A1 | 12/2002 |
| WO | 02101208 A1 | 12/2002 |
| WO | 03023538 A2 | 3/2003 |
| WO | 03048533 A1 | 6/2003 |
| WO | 03065135 A1 | 8/2003 |
| WO | 03078816 A1 | 9/2003 |
| WO | 03102394 A1 | 12/2003 |
| WO | 2004027230 A1 | 4/2004 |
| WO | 2006021437 A1 | 3/2006 |
| WO | 2007078907 A2 | 7/2007 |
| WO | 2008033800 A2 | 3/2008 |
| WO | 2008115911 A1 | 9/2008 |
| WO | 2012078838 A2 | 6/2012 |
| WO | 2013119665 A1 | 8/2013 |
| WO | 2014165439 A2 | 10/2014 |
| WO | 2016053194 A1 | 4/2016 |

OTHER PUBLICATIONS

Van Heiden et al., "Optimization of Urea SCR deNOx Systems for HD Diesel Engines," SAE International 2004-01-0154, 13 pages, 2004.

Van Keulen et al., "Predictive Cruise Control in Hybrid Electric Vehicles," World Electric Vehicle Journal vol. 3, ISSN 2032-6653, pp. 1-11, 2009.

VDO, "UniNOx—Sensor Specification," Continental Trading GmbH, 2 pages, Aug. 2007.

Vereschaga et al., "Piecewise Affine Modeling of NOx Emission Produced by a Diesel Engine," 2013 European Control conference (ECC), pp. 2000-2005, Jul. 17-19, 2013.

Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.

Wang et al., "Fast Model Predictive Control Using Online Optimization," Proceedings of the 17th World Congress, the International Federation of Automatic Control, Seoul, Korea, pp. 6974-6979, Jul. 6-11, 2008.

(56) References Cited

OTHER PUBLICATIONS

Wang et al., "PSO-Based Model Predictive Control for Nonlinear Processes," Advances in Natural Computation, Lecture Notes in Computer Science, vol. 3611/2005, 8 pages, 2005.

Wang et al., "Sensing Exhaust NO2 Emissions Using the Mixed Potential Principal," SAE 2014-01-1487, 7 pages, Apr. 1, 2014.

Wilhelmsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.

Wilhemsson et al., "A Physical Two-Zone NOx Model Intended for Embedded Implementation," SAE 2009-Jan. 1509, 11 pages, 2009.

Winkler et al., "Incorporating Physical Knowledge About the Formation of Nitric Oxides into Evolutionary System Identification," Proceedings of the 20th European Modeling and Simulation Symposium (EMSS), 6 pages, 2008.

Winkler et al., "On-Line Modeling Based on Genetic Programming," 12 pages, International Journal on Intelligent Systems Technologies and Applications 2, 2007.

Winkler et al., "Using Genetic Programming in Nonlinear Model Identification," 99 pages, prior to Jan. 29, 2016.

Winkler et al., "Virtual Sensors for Emissions of a Diesel Engine Produced by Evolutionary System Identification," LNCS, vol. 5717, 8 pages, 2009.

Wong, "CARB Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.

Wright, "Applying New Optimization Algorithms to Model Predictive Control," 5th International Conference on Chemical Process Control, 10 pages, 1997.

Yao et al., "The Use of Tunnel Concentration Profile Data to Determine the Ratio of NO2/NOx Directly Emitted from Vehicles," HAL Archives, 19 pages, 2005.

Zaman, "Lincoln Motor Company: Case study 2015 Lincoln MKC," Automotive Electronic Design Fundamentals, Chapter 6, 2015.

Zavala et al., "The Advance-Step NMPC Controller: Optimality, Stability, and Robustness," Automatica, vol. 45, pp. 86-93, 2009.

Zeilinger et al., "Real-Time MPC—Stability Through Robust MPC Design," Joint 48th IEEE Conference on Decision and Control and 28th Chinese Control Conference, Shanghai, P.R. China, pp. 3980-3986, Dec. 16-18, 2009.

Zeldovich, "The Oxidation of Nitrogen in Combustion and Explosions," Acta Physiochimica U.R.S.S., vol. XX1, No. 4, 53 pages, 1946.

Zelenka, et al., "An Active Regeneration as a Key Element for Safe Particulate Trap Use," SAE Paper No. 2001-0103199, 13 pages, Feb. 2001.

Zhu, "Constrained Nonlinear Model Predictive Control for Vehicle Regulation," Dissertation, Graduate School of the Ohio State University, 125 pages, 2008.

Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.

Desantes et al., "Development of NOx Fast Estimate Using NOx Sensor," EAEC 2011 Congress, 2011. Unable to Obtain a Copy of This Reference.

Andersson et al., "Fast Physical NOx Prediction in Diesel Engines, The Diesel Engine: The Low CO2 and Emissions Reduction Challenge," Conference Proceedings, Lyon, 2006. Unable to Obtain a Copy of This Reference.

Winkler, "Evolutionary System Identification—Modern Approaches and Practical Applications," Kepler Universitat Linz, Reihe C: Technik und Naturwissenschaften, Universitatsverlag Rudolf Trauner, 2009. Unable to Obtain a Copy of This Reference.

Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000. Unable to Obtain a Copy of This Reference.

Locker, et al., "Diesel Particulate Filter Operational Characterization," Coming Incorporated, 10 pages, prior to Feb. 2, 2005.

Lu, "Challenging Control Problems and Engineering Technologies in Enterprise Optimization," Honeywell Hi-Spec Solutions, 30 pages, Jun. 4-6, 2001.

Maciejowski, "Predictive Control with Constraints," Prentice Hall, Pearson Education Limited, 4 pages, 2002.

Manchur et al., "Time Resolution Effects on Accuracy of Real-Time NOx Emissions Measurements," SAE Technical Paper Series 2005-01-0674, 2005 SAE World Congress, 19 pages, Apr. 11-14, 2005.

Mariethoz et al., "Sensorless Explicit Model Predictive Control of the DC-DC Buck Converter with Inductor Current Limitation," IEEE Applied Power Electronics Conference and Exposition, pp. 1710-1715, 2008.

Marjanovic, "Towards a Simplified Infinite Horizon Model Predictive Controller," 6 pages, Proceedings of the 5th Asian Control Conference, 6 pages, Jul. 20-23, 2004.

Mehta, "The Application of Model Predictive Control to Active Automotive Suspensions," 56 pages, May 17, 1996.

Mohammadpour et al., "A Survey on Diagnostics Methods for Automotive Engines," 2011 American Control Conference, pp. 985-990, Jun. 29-Jul. 1, 2011.

Moore, "Living with Cooled-EGR Engines," Prevention Illustrated, 3 pages, Oct. 3, 2004.

Moos, "Catalysts as Sensors—A Promising Novel Approach in Automotive Exhaust Gas Aftertreatment," http://www.mdpi.com/1424-8220/10/7/6773htm, 10 pages, Jul. 13, 2010.

Murayama et al., "Speed Control of Vehicles with Variable Valve Lift Engine by Nonlinear MPC," ICROS-SICE International Joint Conference, pp. 4128-4133, 2009.

National Renewable Energy Laboratory (NREL), "Diesel Emissions Control—Sulfur Effects Project (DECSE) Summary of Reports," U.S. Department of Energy, 19 pages, Feb. 2002.

Olsen, "Analysis and Simulation of the Rate of Heat Release (ROHR) in Diesel Engines," MSc-Assignment, 105 pages, Jun. 2013.

Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.

Ortner et al., "Predictive Control of a Diesel Engine Air Path," IEEE Transactions on Control Systems Technology, vol. 15, No. 3, pp. 449-456, May 2007.

Pannocchia et al., "Combined Design of Disturbance Model and Observer for Offset-Free Model Predictive Control," IEEE Transactions on Automatic Control, vol. 52, No. 6, 6 pages, 2007.

Patrinos et al., "A Global Piecewise Smooth Newton Method for Fast Large-Scale Model Predictive Control," Tech Report TR2010-02, National Technical University of Athens, 23 pages, 2010.

Payri et al., "Diesel NOx Modeling with a Reduction Mechanism for the Initial NOx Coming from EGR or Re-Entrained Burned Gases," 2008 World Congress, SAE Technical Paper Series 2008-01-1188, 13 pages, Apr. 14-17, 2008.

Payri et al., "Methodology for Design and Calibration of a Drift Compensation Method for Fuel-to-Air Ratio," SAE International 2012-01-0717, 13 pages, Apr. 16, 2012.

Pipho et al., "NO2 Formation in a Diesel Engine," SAE Technical Paper Series 910231, International Congress and Exposition, 15 pages, Feb. 25-Mar. 1, 1991.

Qin et al., "A Survey of Industrial Model Predictive Control Technology," Control Engineering Practice, 11, pp. 733-764, 2003.

Querel et al., "Control of an SCR System Using a Virtual NOx Sensor," 7th IFAC Symposium on Advances in Automotive Control, The International Federation of Automotive Control, pp. 9-14, Sep. 4-7, 2013.

Rajamani, "Data-based Techniques to Improve State Estimation in Model Predictive Control," Ph.D. Dissertation, 257 pages, 2007.

Rawlings, "Tutorial Overview of Model Predictive Control," IEEE Control Systems Magazine, pp. 38-52, Jun. 2000.

Ricardo Software, "Powertrain Design at Your Fingertips," retrieved from http://www.ricardo.com/PageFiles/864/WaveFlyerA4_4PP.pdf, 2 pages, downloaded Jul. 27, 2015.

(56) References Cited

OTHER PUBLICATIONS

Salvat, et al., "Passenger Car Serial Application of a Particulate Filter System on a Common Rail Direct Injection Engine," SAE Paper No. 2000-01-0473, 14 pages, Feb. 2000.
Santin et al., "Combined Gradient/Newton Projection Semi-Explicit QP Solver for Problems with Bound Constraints," 2 pages, prior to Jan. 29, 2016.
Schauffele et al., "Automotive Software Engineering Principles, Processes, Methods, and Tools," SAE International, 10 pages, 2005.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling, "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Shamma, et al. "Approximate Set-Valued Observers for Nonlinear Systems," IEEE Transactions on Automatic Control, vol. 42, No. 5, May 1997.
Signer et al., "European Programme on Emissions, Fuels and Engine Technologies (EPEFE)—Heavy Duty Diesel Study," International Spring Fuels and Lubricants Meeting, SAE 961074, May 6-8, 1996.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Stewart et al., "A Model Predictive Control Framework for Industrial Turbodiesel Engine Control," Proceedings of the 47th IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz, 3 pages, 2009.
Storset et al., "Air Charge Estimation for Turbocharged Diesel Engines," vol. 1 Proceedings of the American Control Conference, 8 pages, Jun. 28-30, 2000.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
The MathWorks, "Model-Based Calibration Toolbox 2.1 Calibrate complex powertrain systems," 4 pages, prior to Feb. 2, 2005.
The MathWorks, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Tondel et al., "An Algorithm for Multi-Parametric Quadratic Programming and Explicit MPC Solutions," Automatica, 39, pp. 489-497, 2003.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.

Tschanz et al., "Feedback Control of Particulate Matter and Nitrogen Oxide Emissions in Diesel Engines," Control Engineering Practice, vol. 21, pp. 1809-1820, 2013.
Turner, "Automotive Sensors, Sensor Technology Series," Momentum Press, Unable to Obtain the Entire Book, the Front and Back Covers and Table of Contents are Provided, 2009.
Van Basshuysen et al., "Lexikon Motorentechnik," (Dictionary of Automotive Technology) published by Vieweg Verlag, Wiesbaden 039936, p. 518, 2004. (English Translation).
The Extended European Search Report for EP Application No. 17151521.6, dated Oct. 23, 2017.
The Extended European Search Report for EP Application No. 17163452.0, dated Sep. 26, 2017.
Greenberg, "Hackers Cut a Corvette's Brakes Via a Common Car Gadget," downloaded from https://www.wired.com2015/08/hackers-cut-corvettes-brakes-v . . . , 14 pages, Aug. 11, 2015, printed Dec. 11, 2017.
http://www.blackpoolcommunications.com/products/alarm-immo . . . , "OBD Security OBD Port Protection—Alarms & Immobilizers . . . ," 1 page, printed Jun. 5, 2017.
http://www.cnbc.com/2016/09/20/chinese-company-hacks-tesla-car-remotely.html, "Chinese Company Hacks Tesla Car Remotely," 3 pages, Sep. 20, 2016.
ISO, "ISO Document No. 13185-2:2015(E)," 3 pages, 2015.
"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"J1979 E/E Diagnostic Test Modules," Proposed Regulation, Vehicle E.E. System Diagnostic Standards Committee, 1 page, Sep. 28, 2010.
"MicroZed Zynq Evaluation and Development and System on Module, Hardware User Guide," Avnet Electronics Marketing, Version 1.6, Jan. 22, 2015.
"Model Predictive Control Toolbox Release Notes," The Mathworks, 24 pages, Oct. 2008.
"Model Predictive Control," Wikipedia, pp. 1-5, Jan. 22, 2009. http://en.wikipedia.org/w/index.php?title=Special:Book&bookcmd=download&collecton_id=641cd1b5da77cc22&writer=rl&return_to= Model predictive control, retrieved Nov. 20, 2012.
"MPC Implementation Methods for the Optimization of the Response of Control Valves to Reduce Variability," Advanced Application Note 002, Rev. A, 10 pages, 2007.
"SCR, 400-csi Coated Catalyst," Leading NOx Control Technologies Status Summary, 1 page prior to Feb. 2, 2005.
Actron, "Elite AutoScanner Kit—Enhanced OBD I & II Scan Tool, OBD 1300," Downloaded from https://actron.com/content/elite-autoscanner-kit-enhanced-obd-i-and-obd-ii-scan-tool?utm_ . . . , 5 pages, printed Sep. 27, 2016.
Advanced Petroleum-Based Fuels-Diesel Emissions Control (APBF-DEC) Project, "Quarterly Update," No. 7, 6 pages, Fall 2002.
Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Arregle et al., "On Board NOx Prediction in Diesel Engines: A Physical Approach," Automotive Model Predictive control, Models Methods and Applications, Chapter 2, 14 pages, 2010.
Asprion, "Optimal Control of Diesel Engines," PHD Thesis, Diss ETH No. 21593, 436 pages, 2013.

(56) References Cited

OTHER PUBLICATIONS

Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.
Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.
Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.
Baffi et al., "Non-Linear Model Based Predictive Control Through Dynamic Non-Linear Partial Least Squares," Trans IChemE, vol. 80, Part A, pp. 75-86, Jan. 2002.
Bako et al., "A Recursive Identification Algorithm for Switched Linear/Affine Models," Nonlinear Analysis: Hybrid Systems, vol. 5, pp. 242-253, 2011.
Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.
Bemporad et al., "Model Predictive Control Toolbox 3, User's Guide," Matlab Mathworks, 282 pages, 2008.
Bemporad et al., "The Explicit Linear Quadratic Regulator for Constrained Systems," Automatica, 38, pp. 3-20, 2002.
Bemporad, "Model Predictive Control Based on Linear Programming—The Explicit Solution," IEEE Transactions on Automatic Control, vol. 47, No. 12, pp. 1974-1984, Dec. 2002.
Bemporad, "Model Predictive Control Design: New Trends and Tools," Proceedings of the 45th IEEE Conference on Decision & Control, pp. 6678-6683, Dec. 13-15, 2006.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints," SIAM J. Control and Optimization, vol. 20, No. 2, pp. 221-246, Mar. 1982.
Blanco-Rodriguez, "Modelling and Observation of Exhaust Gas Concentrations for Diesel Engine Control," Phd Dissertation, 242 pages, Sep. 2013.
Blue Streak Electronics Inc., "Ford Modules," 1 page, May 12, 2010.
Borrelli et al., "An MPC/Hybrid System Approach to Traction Control," IEEE Transactions on Control Systems Technology, vol. 14, No. 3, pp. 541-553, May 2006.
Borrelli, "Constrained Optimal Control of Linear and Hybrid Systems," Lecture Notes in Control and Information Sciences, vol. 290, 2003.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Bourn et al., "Advanced Compressor Engine Controls to Enhance Operation, Reliability and Integrity," Southwest Research Institute, DOE Award No. DE-FC26-03NT41859, SwRI Project No. 03.10198, 60 pages, Mar. 2004.
Catalytica Energy Systems, "Innovative NOx Reduction Solutions for Diesel Engines," 13 pages, 3rd Quarter, 2003.
Charalampidis et al., "Computationally Efficient Kalman Filtering for a Class of Nonlinear Systems," IEEE Transactions on Automatic Control, vol. 56, No. 3, pp. 483-491, Mar. 2011.
Chatterjee, et al. "Catalytic Emission Control for Heavy Duty Diesel Engines," JM, 46 pages, prior to Feb. 2, 2005.
Chew, "Sensor Validation Scheme with Virtual NOx Sensing for Heavy Duty Diesel Engines," Master's Thesis, 144 pages, 2007.

European Search Report for EP Application No. 11167549.2 dated Nov. 27, 2012.
European Search Report for EP Application No. 12191156.4-1603 dated Feb. 9, 2015.
European Search Report for EP Application No. EP 10175270.7-2302419 dated Jan. 16, 2013.
European Search Report for EP Application No. EP 15152957.5-1807 dated Feb. 10, 2015.
The Extended European Search Report for EP Application No. 15155295.6-1606, dated Aug. 4, 2015.
U.S. Appl. No. 15/005,406, filed Jan. 25, 2016.
U.S. Appl. No. 15/011,445, filed Jan. 29, 2016.
De Oliveira, "Constraint Handling and Stability Properties of Model Predictive Control," Carnegie Institute of Technology, Department of Chemical Engineering, Paper 197, 64 pages, Jan. 1, 1993.
De Schutter et al., "Model Predictive Control for Max-Min-Plus-Scaling Systems," Proceedings of the 2001 American Control Conference, Arlington, Va, pp. 319-324, Jun. 2001.
The Extended European Search Report for Corresponding EP Application No. 15179435.1-1807, dated Apr. 1, 2016.
Shahzad et al., "Preconditioners for Inexact Interior Point Methods for Predictive Control," 2010 American Control Conference, pp. 5714-5719, Jun. 30-Jul. 2, 2010.
Delphi, Delphi Diesel NOx Trap (DNT), 3 pages, Feb. 2004.
Diehl et al., "Efficient Numerical Methods for Nonlinear MPC and Moving Horizon Estimation," Int. Workshop on Assessment and Future Directions of NMPC, 24 pages, Pavia, Italy, Sep. 5-9, 2008.
Ding, "Characterising Combustion in Diesel Engines, Using Parameterised Finite Stage Cylinder Process Models," 281 pages, Dec. 21, 2011.
Docquier et al., "Combustion Control and Sensors: a Review," Progress in Energy and Combustion Science, vol. 28, pp. 107-150, 2002.
Dunbar, "Model Predictive Control: Extension to Coordinated Multi-Vehicle Formations and Real-Time Implementation," CDS Technical Report 01-016, 64 pages, Dec. 7, 2001.
Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.
Ericson, "NOx Modelling of a Complete Diesel Engine/SCR System," Licentiate Thesis, 57 pages, 2007.
Finesso et al., "Estimation of the Engine-Out NO2/NOx Ration in a Euro VI Diesel Engine," SAE International 2013-01-0317, 15 pages, Apr. 8, 2013.
Fleming, "Overview of Automotive Sensors," IEEE Sensors Journal, vol. 1, No. 4, pp. 296-308, Dec. 2001.
Ford Motor Company, "2012 My OBD System Operation Summary for 6.7L Diesel Engines," 149 pages, Apr. 21, 2011.
Formentin et al., "NOx Estimation in Diesel Engines Via In-Cylinder Pressure Measurement," IEEE Transactions on aontrol Systems Technology, vol. 22, No. 1, pp. 396-403, Jan. 2014.
Galindo, "An On-Engine Method for Dynamic Characterisation of NOx Concentration Sensors," Experimental Thermal and Fluid Science, vol. 35, pp. 470-476, 2011.
Gamma Technologies, "Exhaust Aftertreatment with GT-Suite," 2 pages, Jul. 17, 2014.
GM "Advanced Diesel Technology and Emissions," powertrain technologies—engines, 2 pages, prior to Feb. 2, 2005.
Goodwin, "Researchers Hack a Corvette's Brakes Via Insurance Black Box," Downloaded from http://www.cnet.com/roadshow/news/researchers-hack-a-corvettes-brakes-via-insurance-black-box/, 2 pages, Aug. 2015.
Greenberg, "Hackers Remotely Kill a Jeep on the Highway—With Me in It," Downloaded from http://www.wired.com/2015/07/hackers-remotely-kill-jeep-highway/, 24 pages, Jul. 21, 2015.
Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.

(56) References Cited

OTHER PUBLICATIONS

Guardiola et al., "A Computationally Efficient Kalman Filter Based Estimator for Updating Look-Up Tables Applied to NOx Estimation in Diesel Engines," Control Engineering Practice, vol. 21, pp. 1455-1468.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella et al., "Introduction to Modeling and Control of Internal Combustion Engine Systems," 303 pages, 2004.
Guzzella, et al., "Control of Diesel Engines," IEEE Control Systems Magazine, pp. 53-71, Oct. 1998.
Hahlin, "Single Cylinder ICE Exhaust Optimization," Master's Thesis, retrieved from https://pure.ltu.se/portal/files/44015424/LTU-EX-2013-43970821.pdf, 50 pages, Feb. 1, 2014.
Hammacher Schlemmer, "The Windshield Heads Up Display," Catalog, p. 47, prior to Apr. 26, 2016.
Havelena, "Componentized Architecture for Advanced Process Management," Honeywell International, 42 pages, 2004.
Heywood, "Pollutant Formation and Control," Internal Combustion Engine Fundamentals, pp. 567-667, 1988.
Hiranuma, et al., "Development of DPF System for Commercial Vehicle—Basic Characteristic and Active Regeneration Performance," SAE Paper No. 2003-01-3182, Mar. 2003.
Hirsch et al., "Dynamic Engine Emission Models," Automotive Model Predictive Control, Chapter 5, 18 pages, LNCIS 402, 2012.
Hirsch et al., "Grey-Box Control Oriented Emissions Models," The International Federation of Automatic Control (IFAC), Proceedings of the 17th World Congress, pp. 8514-8519, Jul. 6-11, 2008.
Hockerdal, "EKF-based Adaptation of Look-Up Tables with an Air Mass-Flow Sensor Application," Control Engineering Practice, vol. 19, 12 pages, 2011.
Honeywell, "Profit Optimizer A Distributed Quadratic Program (DQP) Concepts Reference," 48 pages, prior to Feb. 2, 2005.
http://nexceris.com/news/nextech-materials/, "Nextech Materials is Now Nexceris," 7 pages, printed Oct. 4, 2016.
http://www.arb.ca.gov/msprog/obdprog/hdobdreg.htm, "Heavy-Duty OBD Regulations and Rulemaking," 8 pages, printed Oct. 4, 2016.
http://www.not2fast.wryday.com/turbo/glossary/turbo_glossary.shtml, "Not2Fast: Turbo Glossary," 22 pages, printed Oct. 1, 2004.
http://www.tai-cwv.com/sb1106.0.html, "Technical Overview—Advanced Control Solutions," 6 pages, printed Sep. 9, 2004.
https://www.dieselnet.com/standards/us/obd.php, "Emission Standards: USA: On-Board Diagnostics," 6 pages, printed Oct. 3, 2016.
https://www.en.wikipedia.org/wiki/Public-key_cryptography, "Public-Key Cryptography," 14 pages, printed Feb. 26, 2016.
Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.
Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.
Jensen, "The 13 Monitors of an OBD System," http://www.oemoffhighway.com/article/1 0855512/the-13-monito . . . , 3 pages, printed Oct. 3, 2016.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-1183, Mar. 2003.
Keulen et al., "Predictive Cruise Control in Hybrid Electric Vehicles," World Electric Journal, vol. 3, ISSN 2032-6653, 11 pages, May 2009.
Khair et al., "Emission Formation in Diesel Engines," Downloaded from https://www.dieselnet.com/tech/diesel_emiform.php, 33 pages, printed Oct. 14, 2016.
Kihas et al., "Chapter 14, Diesel Engine SCR Systems: Modeling Measurements and Control," Catalytic Reduction Technology (book), Part 1, Chapter 14, prior to Jan. 29, 2016.
Kolmanovsky et al., "Issues in Modeling and Control of Intake Flow in Variable Geometry Turbocharged Engines", 18th IFIP Conf. System Modeling and Optimization, pp. 436-445, Jul. 1997.
Krause et al., "Effect of Inlet Air Humidity and Temperature on Diesel Exhaust Emissions," SAE International Automotive Engineering Congress, 8 pages, Jan. 8-12, 1973.
Kulhavy et al. "Emerging Technologies for Enterprise Optimization in the Process Industries," Honeywell, 12 pages, Dec. 2000.
Lavoie et al., "Experimental and Theoretical Study of Nitric Oxide Formation in Internal Combustion Engines," Combustion Science and Technology, vol. 1, pp. 313-326, 1970.

* cited by examiner $$\min \frac{1}{2} x^T H x + f^T x$$

$$s.t. \quad lb \leq x \leq ub$$

$$P(Z^T H Z) P^T p_z = P(-Z^T g) \quad \sim S7$$

$$p = P^T Z p_z \quad \sim S8$$

FIGURE 7

| Number of inactive constraints | | | |
|---|---|---|---|
| 0 | 1 | 2 | 3 |
| {} | 1 →  | 1 2 → | 1 2 3 |
|  | 2 → | 2 3 |  |
|  | 3 → | 3 1 |  |

← 64

Circled: saved
The rest: created by cutting off (no flops)
◂---- deduction from

FIGURE 9

| 0 | 1 | 2 | 3 | 4 | 5 | 6 |
|---|---|---|---|---|---|---|
| 0 | 1 | 1 2 | 1 2 3 | 1 2 3 4 | 1 2 3 4 5 | 1 2 3 4 5 6 |
|   | 2 | 2 3 | 2 3 4 | 2 3 4 5 | 2 3 4 5 6 |   |
|   | 3 | 3 4 | 3 4 5 | 3 4 5 6 | 3 4 5 6 1 |   |
|   | 4 | 4 5 | 4 5 6 | 4 5 6 1 | 4 5 6 1 2 |   |
|   | 5 | 5 6 | 5 6 1 | 5 6 1 2 | 5 6 1 2 3 |   |
|   | 6 | 6 1 | 6 1 2 | 6 1 2 3 | 6 1 2 3 4 |   |
|   |   | 3 1 | 3 1 4 | 3 1 4 5 |   |   |
|   |   | 4 1 | 4 1 5 | 4 1 5 2 |   |   |
|   |   | 5 1 | 5 1 2 | 5 1 2 3 |   |   |
|   |   | 4 2 | 4 2 1 | 4 2 1 6 |   |   |
|   |   | 5 2 | 5 2 4 | 5 2 4 6 |   |   |
|   |   | 6 2 | 6 2 4 | 6 2 4 3 |   |   |
|   |   | 5 3 | 5 3 2 | 5 3 2 6 |   |   |
|   |   | 6 3 | 6 3 5 | 6 3 5 1 |   |   |
|   |   | 6 4 | 6 4 3 | 6 4 3 1 |   |   |
|   |   |     | 6 5 2 |         |   |   |
|   |   |     | 6 3 2 |         |   |   |
|   |   |     | 6 4 1 |         |   |   |
|   |   |     | 6 3 1 |         |   |   |
|   |   |     | 5 3 1 |         |   |   |

FIGURE 11

QUADRATIC PROGRAM SOLVER FOR MPC USING VARIABLE ORDERING

BACKGROUND

The present disclosure pertains to control systems and particularly to model predictive control. More particularly, the disclosure pertains to quadratic programming solvers.

SUMMARY

The disclosure reveals a system and approach for storing factors in a quadratic programming solver of an embedded model predictive control platform. The solver may be connected to an optimization module which may be connected to a factorization module. The factorization module may incorporate a memory containing saved factors that may be connected to a factor search mechanism to find a nearest stored factor in the memory. A factor update unit may be connected to the factor search mechanism to obtain the nearest stored factor to perform a factor update. The factorization module may provide variable ordering to reduce a number of factors that need to be stored to permit the factors to be updated at zero floating point operations per unit of time.

BRIEF DESCRIPTION OF THE DRAWING

FIG. 1 is a diagram of a formula that illustrates box constrained quadratic programming;

FIGS. 7 and 8 are diagrams that relate to variable ordering finding;

FIG. 9 is a diagram of a table pertinent to selection of factors for storage;

FIG. 11 is a diagram of a table representing an illustrative example of an ordering scheme.

DESCRIPTION

Figure 2:
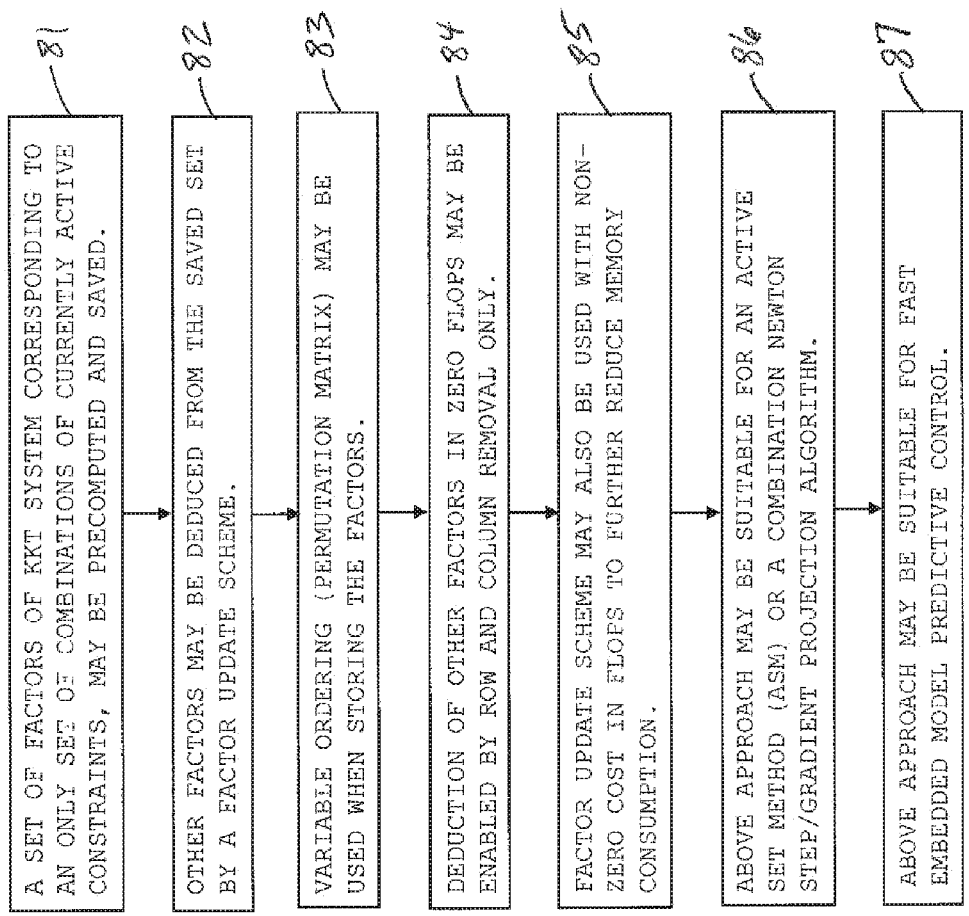
FIG. 2 is a diagram revealing a process incorporating variable ordering used when storing factors.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present approach may be used for solving QP for embedded MPC application using factor updating. Advanced control problems may usually be formulated as mathematical optimization. As an example, one may mention the model predictive control (MPC) which may often be formulated as a parametric quadratic programming (QP) issue. In the MPC, it may be necessary to solve the parametric QP problem on-line and therefore there may be a need for reliable and fast numerical solvers for QP.

For standard MPC applications in process control, sampling periods may often be in the order of seconds or minutes. Such sampling periods may be long enough to solve a needed QP problem by using a standard powerful PC. MPC may often be used in other than process control applications, such as automotive and aircraft control systems. In the latter applications, sampling frequencies may be higher and the computational resources appear to be limited (CPU, memory). Therefore, if one would like to utilize the MPC control approach under such conditions, there may be a need for fast and tailored QP solvers for embedded applications with limited CPU power and memory.

The present approach appears suitable for solving small QP optimization problems in MPC applications with simple (or box) constraints. Simple constraints for optimization variables may be defined as their lower and upper bounds, e.g., "LB<=X<=UB" where X is an optimization variable, LB and UB are the lower and upper bounds, respectively. It may be used for embedded systems (e.g., automotive, aircraft, and so on).

There may be efficient solvers for solving the QP problems with simple constraints. Two basic algorithm classes may be active set solvers (ASS) and interior point solvers (IPS). The IPS approaches may be suitable for large-scale problems while the ASS approaches may be faster for small to medium size issues. The QP problems in MPC control may be classified as small to medium size problems and therefore ASS approaches appear to be useable. The solvers may be iterative and work with a set of active constraints in each of the iterations. The set of active constraints may be updated during the iterations. During each iteration of an ASS based solver, most of the computational time may be spent on a computation of the Newton step which is in a complexity of $N^3$ flops (floating point operations per second).

A basic approach may enable one to add or remove a single constraint in a working set which may not necessarily be efficient in a case where there should be large change in the active set to find the optimum.

There may be a class of ASS algorithms for solving the QP problems with simple constraints based only on a gradient projection. The gradient projection based approaches may enable one to add or remove multiple constraints from a working set in each iteration, which can enable quicker identification of a set of active constraints in the optimum. However, these approaches may use a steepest descent direction which might be inefficient and thus the convergence may be too slow, and therefore many iterations may be needed. On the other hand, each iteration may be very inexpensive since only the gradient has to be evaluated in a complexity of $N^2$ flops.

Finally, there may also exist a class of algorithms which combines both previously mentioned items. The algorithms may use a gradient projection approach for quick identification of the optimal working set, and use the ASS's Newton step computation to improve the convergency, so as to decrease a number of needed iterations. However, these algorithms may involve a computation of the Newton step with a complexity of $N^3$ flops in each iteration which can lead to slow computation.

The present approach may enable a decrease of the computation time at each iteration by precomputing some part of the Newton step process in combination with a gradient/Newton projection algorithm or an ASS approach or algorithm. In the ASS based algorithm, a KKT (Karush-Kuhn-Tucker) system for currently active constraints may have to be solved at each iteration by using some factorization (LDL, Cholesky, or the like). Thus, it may be possible to precompute and store all or only some factors (partially or whole) of all potential KKT matrices. During a solution, these (partial) factors may be loaded from memory, the factorization process may be finished and then used in the computation of the Newton step in a standard way.

An issue with this approach is that the number of all possible factors of all possible KKT matrices may grow rapidly with the number of QP variables (as with $2^N$). This growth may prevent the use of such algorithm for a relatively large N.

The present approach may be similar to a standard way to precompute some factors and store them and use them in the same way in the solution.

But contrary to the standard way, where the factor is computed from scratch if a combination of active constraints corresponding to an unsaved factor is encountered during the on-line computation; in the present approach, the "nearest factor" may be found in the memory and, after that, updated to obtain a factor which is afterwards used in the computation. The "nearest factor" in this sense may be the factor for which the size of the following set is smallest: $\{N\backslash S\}+\{S\backslash N\}$, where N is a set of indices of inactive constraints for a wanted factor, and S is a set of indices of inactive constraints corresponding to a stored factor. The update process may involve additional computation with complexity of $N^2$ flops which is not necessarily limiting. Also, this approach may lead to the fact that radically less of the factors have to be stored and thus improve the memory limitation of the standard way.

The present approach may be implemented as a software module and be used as a core optimization solver for MPC control for embedded applications (e.g., automotive or aircraft control systems). The approach may be suitable, namely in combination with a gradient projection based QP solver.

As it was said already, one approach for solving a QP problem originated from MPC may incorporate a use of online solvers based on an active set strategy; where for each iteration, the so-called Newton process may be computed for a currently estimated active set of working constraints. This may be done via solving a set of linear equations (KKT conditions) usually by a factorization approach which appears as the most computational complex part of the algorithm.

It may be possible to pre-compute and save virtually all factors of possible combinations of a working set, and then, during the online phase, only load them from a memory to virtually completely reduce the computation burden associated with factorization. On the other hand, such approach may lead to a significant memory need which grows exponentially with a number of optimization variables.

An approach may be to exploit the fact that for box constrained QP issues, the reduced Hessian (THZ) which needs to be factored, can be obtained only be removing the rows and columns of Hessian H which corresponds to the active constraints.

Then when having the corresponding factor of such reduced Hessian with some active constraints, the factor of a new reduced Hessian for the same active constraints plus an additional one may be easily computed only by cutting off the row and column of the original reduced Hessian, i.e., by an updating process. This updating process appears much less computationally expensive (i.e., $O(n^2)$ instead of $O(n^3)$ FLOPS for a computation from scratch).

However, if a special variable ordering is used, then an updating process may be reduced to 0 FLOPS by only removing the last row and column of the factors.

Thus, a goal may be to find a variable ordering in such a way that only a few factors are stored and loaded from memory when needed and the rest of them are created from them by a "fast updating process" with 0 FLOPS complexity. This may limit the computational complexity of the factorization process and also greatly limit the memory need as compared to a case when all of the factors are stored.

A special variable ordering scheme may divide the factors according their size number of rows) into groups and try to maximize an overlay of variable indices corresponding to inactive constraints at the beginning between the groups, i.e., to allow a multiple cut-off of rows and columns with 0 FLOPS update.

A first approach may be to precompute some factors off-line and save them and then in the on-line phase, use a factor update of the "nearest" factor for currently inactive constraints W. A factor update process may have a complexity $O(n^2)$ per each change—adding or removing one or more rows and/or columns.

For each saved factor, it may be saved information to which a combination of inactive constraints corresponds (such as S).

A nearest factor may be defined as the one with smallest needed changes in the N that is needed to obtain S, i.e., how many rows have to be removed from/added to the stored factor by a factor update process to obtain a factor for currently inactive constraints (those in the set N).

A second approach may be to use an ordering of variables for each combination of indices in N, such that the update process can be done with zero computational complexity first by removing rows of the saved factor.

Ak, Wk may represent a working set of constraint indices indicating which components of optimization vector are on the limits at a k-th iteration of an algorithm. Nk may represent a set of indices of constraints indicating which components of an optimization vector are free, that is not on a limit at the k-th iteration of the algorithm.

FIG. 1 is a diagram that may regard an issue to be resolved, which can be a box constrained quadratic programming as shown by formula 21 with its constraints, having a positive definite Hessian. Such issue may arise in various situations such as an MPC.

FIG. 2 is a diagram of the present approach. A feature may incorporate is variable ordering to further reduce the factors that need to be stored allowing them to be updated in 0 FLOPs cost. At symbol 81, a set of factors of a KKT system corresponding to an only set of combinations of currently active constraints, may be precomputed and saved. Other factors may be deduced from the saved set by a factor update scheme according to symbol 82. Variable ordering (i.e., permutation matrix) may be used when storing the factors at symbol 83. Deduction of other factors in zero FLOPs just by row and column removal may be enabled according to symbol 84. A factor update scheme may be used with a non-zero cost in FLOPS to her reduce memory consumption at symbol 85. According to symbol 86, the present approach may be suitable for an active set method or a combination of a Newton step/gradient projection algorithm. The approach may also be suitable for fast embedded model predictive control as noted at symbol 87. The items of symbols 81-87 may or may not be noted in numerical order of the symbols.

Figure 3:
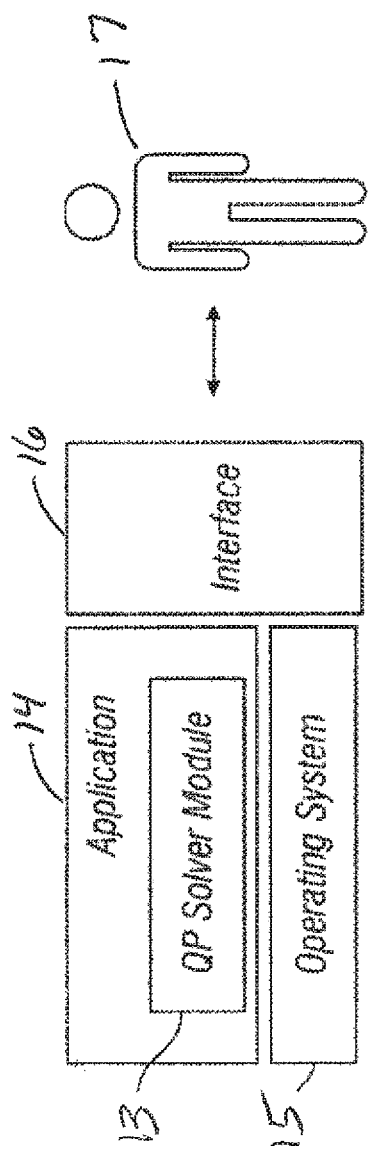
FIG. 3 is a diagram of a module in a context of an application which is integrated with an operating system and an interface.

FIG. 3 is a diagram of a module 13 in a context of an application 14 which is integrated with an operating system 15 and an interface 16. A user or operator 17 may interact with interface 16.

Figure 4:
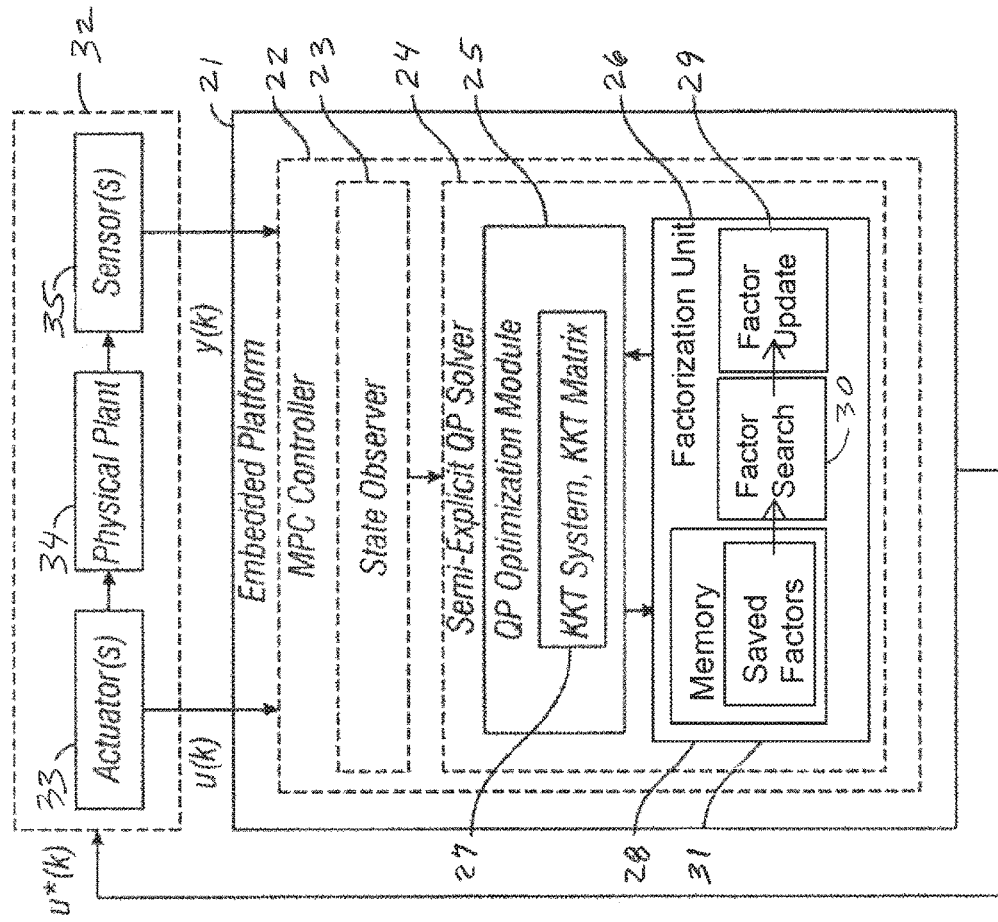
FIG. 4 is a diagram of an embedded platform that may contain an MPC with a semi-explicit quadratic programming solver having a factorization unit with saved factors, factor search and factor update modules.

FIG. 4 is a diagram of an embedded platform 21 that may contain an MPC 16. The present approach may be placed within a higher picture relative to the surrounding systems and main idea can be captured there. The present approach may "live inside" some semi-explicit QP solver and consist of three main parts such as a memory with saved factors and algorithm with a search for a factor and a factor update algorithm.

Controller 22 may incorporate a state observer 23 connected to a semi-explicit QP solver 24. Solver 24 may have a QP optimization module 25 that encompasses a KKT system and matrix 27. Solver 24 may also have a factorization unit 26 connected to QP optimization module 25. Factorization unit 26 may have a memory 28 that contains a saved factors module 31. Saved factors module 31 may be connected to a factor search module 30 that is connected to a factor update module 29. Factor search module 30 and Factor update module may be outside of memory 28 but within factorization unit 26. Modules 31,30 and 29 are a feature of the present approach.

An output of embedded platform 22 may be connected to a unit 32. Unit 32 may have one or more actuators 33 connected to MPC controller 22 and to a physical plant 34 in unit 22, for instance, an engine and/or an after treatment system. Unit 32 may also have one or more sensors 35 connected to physical plant 34 and to MPC controller 22.

Figure 5:
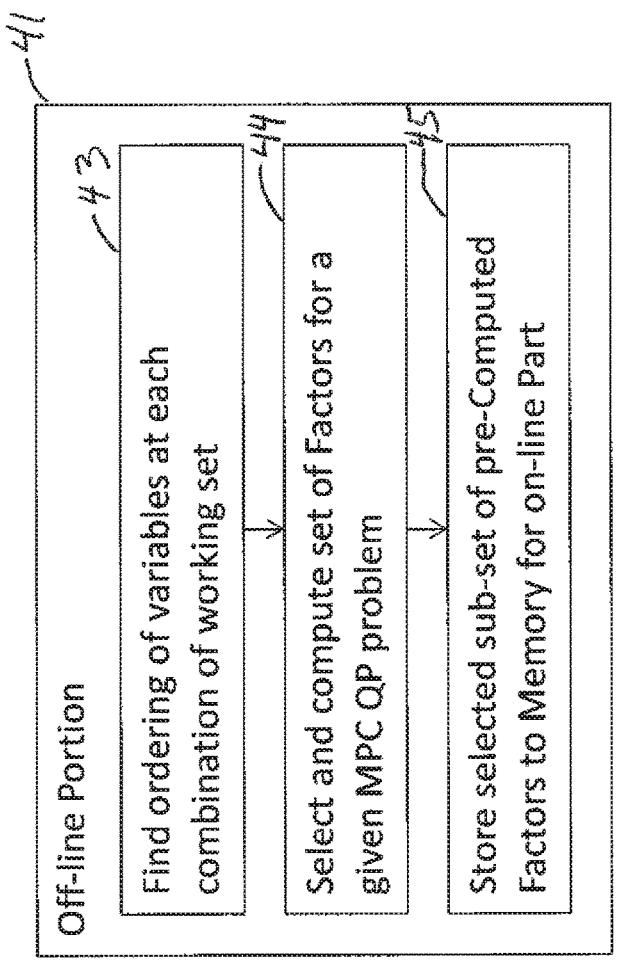
FIGS. 5 and 6 are diagrams that reveal an off-line portion and an on-line portion, respectively, of the present approach.
Figure 6:
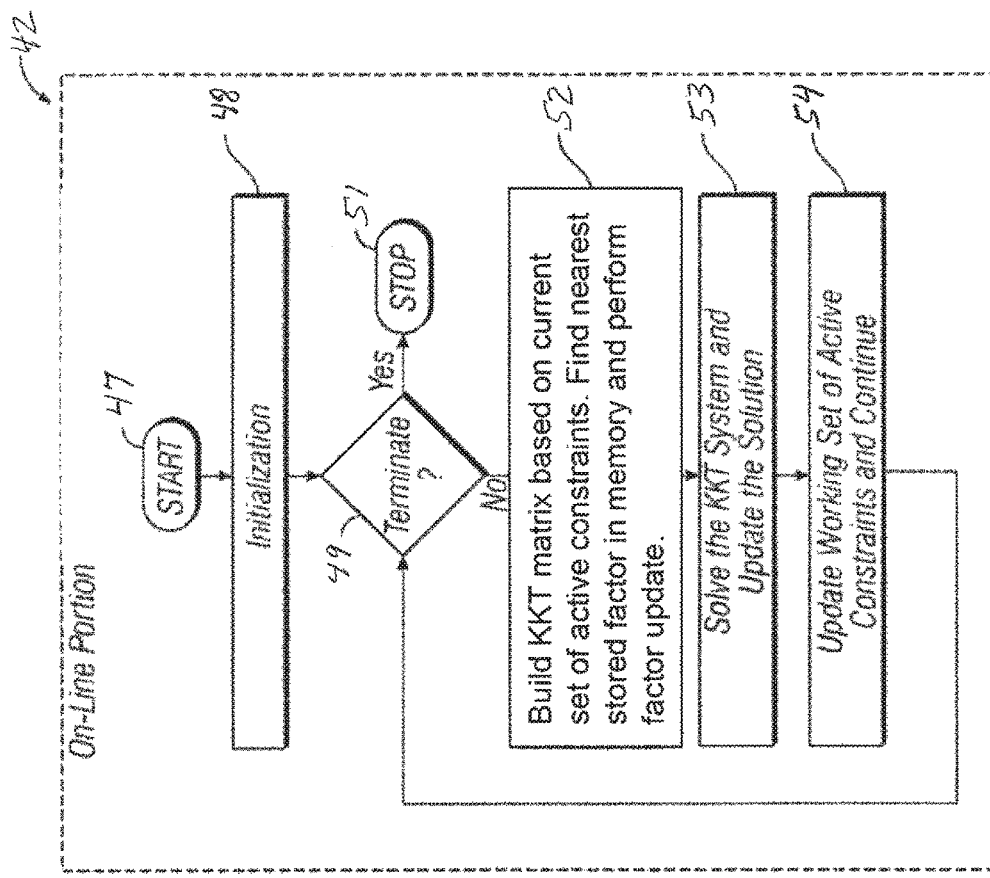

FIG. 5 and FIG. 6 are diagrams that reveal an off-line portion 41 and an on-line portion 42, respectively, of an algorithm for the present platform 21. Off-line portion 41 may incorporate an action to find an ordering of variables at each combination of a working set as indicated in symbol 43. The content of symbol 43 may be a feature of the present approach. To select and compute a set of factors for a given MPC QP issue as indicated in symbol 44 may follow the action of symbol 43. Some set of factors may be computed here and only part of them needs to be stored as noted in symbol 45. Thus, symbol 45, which may follow symbol 44, may indicate an action to store a selected sub-set of pre-computed factors to a memory for on-line portion 42.

On-line portion 42 in a diagram of FIG. 5 may be of a semi-explicit QP solver like that of solver 24 in FIG. 3. Portion 42 may begin at symbol 47 followed by an initialization at symbol 48. Following symbol 48, a question of whether to terminate portion 42 may be asked at symbol 49. If an answer is yes, then portion 42 may stop at symbol 51. If the answer is no, then at symbol 52, a KKT matrix may be built based on a current set of active constraints; a nearest stored factor may be found in the memory and a factor update may be performed. The finding the nearest stored factor in the memory and performing the factor update are feature of the present approach. After symbol 52, a KKT system may be solved and a solution may be updated at symbol 53. Then a working set of active constraints may be updated at symbol 54 and activity of portion 42 may continue on to symbol 49 where the question of termination may be asked.

The present approach in the diagrams of FIG. 4 through FIG. 6 may also be used for a combined Newton/gradient projection algorithm.

Figure 8:
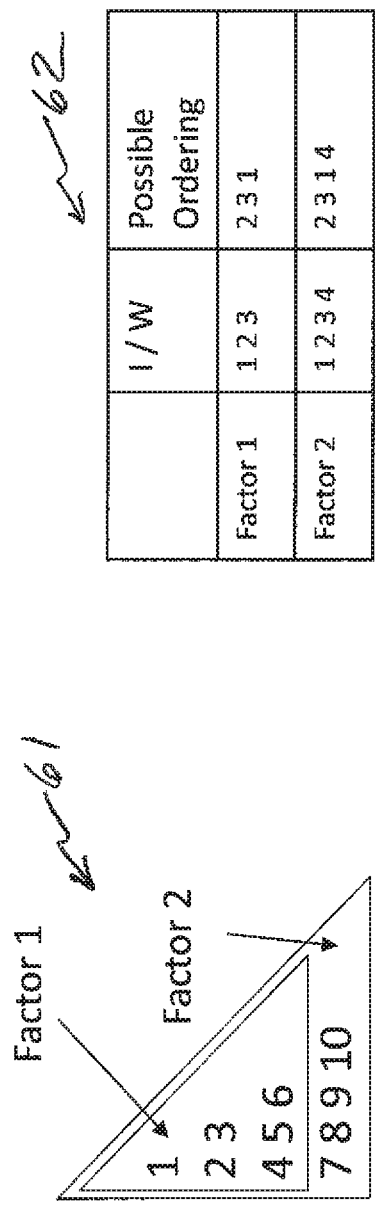

FIG. 7 and FIG. 8 are diagrams that relate to variable ordering finding. They may indicate what is variable ordering and how it effects a factor structure. At each iteration, a KKT system may be solved, an equation 57 and an equation 58 may be solved for the KKT system. The terms relative to the equations may be as the following. Z is base of null space of Jacobian of currently active constraints corresponding to the set of indices W, g is a current gradient, $p_z$ is a Newton step in the free components, P is permutation matrix(variable ordering), and p is a Newton step.

P (variable ordering) may be found such that an overlay of Z'HZ is as large as possible for all combinations of active constraints such that only a subset of all possible factors of Z'HZ needs to be solved. This ordering could be found by brute force optimization or by some heuristics.

A diagram in FIG. 8 may reveal an overlay 61 of a factor 1 over a factor 2. Hence Factor 1 can be deduced from Factor 1 by simply removing last row of Factor 2. Another diagram of FIG. 8 may reveal a table 62 an example of possible ordering of variables within factors 1 and 2 such that for inactive set N=1/W.

FIG. 9 is a diagram of a table 64 relative to selection of factors to store. Table 64 indicates an example of variable ordering for problem with three variables. The arrows may stand for "deduction from". The circled numbers may be saved. Rest of the numbers may be created by cutting them off (i.e., no FLOPS).

Only large factors (corresponding to large number of inactive constraints) may be stored. Variable ordering may be used inside the factors. Zero flops deduction of other factors may be enabled. For illustrative examples, a factor with an inactive set {1 2} may be deduced from factor {1 2 3} only by removal of last row, and a factor with an inactive set {1 3} may have to be solved or stored since there is no factor which enables a 0 FLOPS deduction.

An objective is to speed-up a solution of a KKT system solution. There may be a use of a factor update of a reduced Hessian and variable ordering. By using "clever" variable ordering, then only a subset of factors for each combination of active set may have to be solved. Rest of factors may be computed with 0 flops (floating point operations) by removal of rows.

Figure 10:
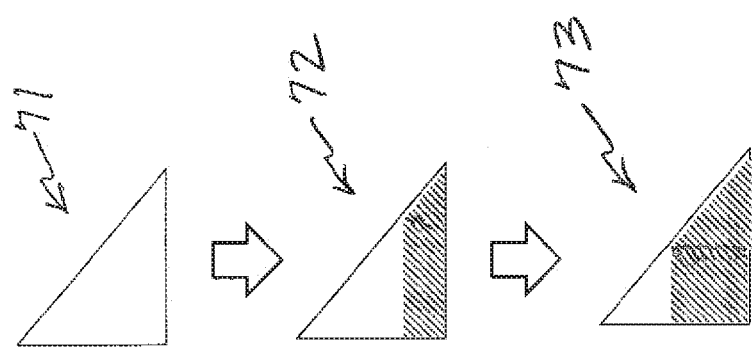
FIG. 10 is a diagram of an illustrative example of a factor storing scheme.

FIG. 10 is a diagram that illustrates an example of a factor storing scheme. Triangle 71 represents a saved factor for inactive constraints {1,2,3}. Triangle 72 represents a computed factor for inactive constraints {1,2}. Just the last row is deleted as indicated by the shaded area. Triangle 73 represents a computerized factor for inactive constraints {1}. Just the last two rows and columns are deleted. A sequence may be from triangle 71, though triangle 72 to triangle 73. The diagram reveals a basis for a 0 FLOP fast factor update.

FIG. 11 is a diagram of a table 75 representing an example of an ordering scheme for QP problem with six optimization variables (n=6). Indices may indicate which constraints are inactive. An order may then indicate an ordering of corresponding data in a factor. Arrows 76 may indicate the transitions from one index to a lower index. Circles 77 may indicate the numerals that are saved. Numerals may be created by a cutting off (i.e., no FLOPS). Some numerals (not shown) may be computed by an augmented update.

A nearest factor search may be conducted. In an on-line phase the "nearest" stored factor to the currently active constraints W may have to be found. For each saved factor, it is saved information to which combination of active constraints it corresponds (i.e., S). The nearest factor may be defined as the one with smallest needed changes in the Wk is needed to obtain S, i.e., how many rows has to be removed from/added to stored factor by factor update process to obtain factor for currently active constraints (those in the set W).

To recap, a system for quadratic programming may incorporate an embedded platform comprising a model predictive control (MPC) controller connected to a physical subsystem. The MPC controller may incorporate a state observer and a semi-explicit quadratic programming (QP) solver connected to the state observer.

The semi-explicit QP solver may incorporate an optimization module and a factorization module connected to the QP optimization module. The factorization module may incorporate a memory having a saved factors unit, a factor search mechanism connected to the saved factors unit, and a factor update mechanism connected to the factor search mechanism.

The factorization module may provide variable ordering to reduce factors which need to be stored to allow them to be updated at a zero floating-point operations per unit time (FLOPs) cost.

The physical subsystem may incorporate a physical plant, one or more sensors situated at the physical plant and connected to the MPC controller, and one or more actuators attached to the physical plant and connected to the MPC controller. The physical plant may be an internal combustion engine or after-treatment device.

The optimization module may incorporate a Karush-Kuhn-Tucker (KKT) subsystem having a KKT matrix.

An approach for storing factors, may incorporate precomputing a set of factors of a matrix corresponding to an only set of combinations of currently active constraints, saving the set of factors, deducing other factors from one or more factors of the set of factors with a factor update scheme, storing the factors with variable ordering, enabling a deduction of the other factors in zero floating-point operations per unit time (FLOPs) by just a row and/or column removal, and using a factor update with non-zero cost in FLOPs to further reduce memory consumption.

The approach may further incorporate computing an active set based approach using pre-computed factors such as a Newton step/gradient projection approach.

The factor update may be used in embedded model predictive control.

The variable ordering may be accomplished with a permutation matrix.

The matrix may be of a Karush-Kuhn-Tucker (KKT) system.

A process for solving a quadratic programming issue, may incorporate an off-line portion, and an on-line portion. The off-line portion may incorporate finding an ordering of variables at each combination of a working set, selecting and computing a set of factors for a model predictive control (MPC) quadratic programming (QP) issue, and storing a selected subset of the set of factors. The on-line portion may incorporate initializing an on-line process, building a matrix on a current set of constraints, finding a nearest stored factor from the memory, performing a factor update with the nearest stored factor, solving the matrix, and updating a solution for a QP issue.

The process may further incorporate updating a working set of active constraints.

The matrix may be a Karush-Kuhn-Tucker (KKT) matrix.

The process may further incorporate reiterating the on-line portion.

The process may further incorporate terminating the on-line portion.

U.S. Pat. No. 8,504,175, issued Aug. 6, 2013, and entitled "Using Model Predictive Control to Optimize Variable Trajectories and System Control", is hereby incorporated by reference. U.S. Pat. No. 8,924,331, issued Dec. 30, 2014, and entitled "System and Method for Solving Quadratic Programming Problems with Bound Constraints Utilizing a Semi-Explicit Quadratic Programming Solver", is hereby incorporated by reference.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for quadratic programming comprising:
an embedded platform comprising a model predictive control (MPC) controller connected to a physical subsystem; and
wherein the MPC controller comprises:
  a state observer; and
  a semi-explicit quadratic programming (QP) solver connected to the state observer; and
  wherein the semi-explicit QP solver comprises:
    an optimization module;
    a factorization module connected to the QP optimization module;
    wherein the factorization module comprises:
      a memory having a saved factors unit;
      a factor search mechanism connected to the saved factors unit; and
      a factor update mechanism connected to the factor search mechanism; and
    wherein the factorization module provides variable ordering to reduce factors which need to be stored to allow them to be updated at a zero floating-point operations per unit time (FLOPS) cost.

2. The system of claim 1, wherein the physical subsystem comprises:
a physical plant;
one or more sensors situated at the physical plant and connected to the MPC controller; and
one or more actuators attached to the physical plant and connected to the MPC controller.

3. The system of claim 2, wherein the physical plant is an internal combustion engine or after-treatment device.

4. The system of claim 1, wherein the optimization module comprises a Karush-Kuhn-Tucker (KKT) subsystem having a KKT matrix.

\* \* \* \* \*